(12) United States Patent
Bartoli et al.

(10) Patent No.: US 9,902,554 B2
(45) Date of Patent: Feb. 27, 2018

(54) CAPSULE FOR BEVERAGE AND MACHINE FOR PRODUCING A BEVERAGE

(75) Inventors: Andrea Bartoli, Reggio Emilia (IT); Elio Sanibondi, Reggio Emilia (IT)

(73) Assignee: Sarong Societa' per Azioni (IT)

( * ) Notice: Subject to any disclaimer, the term of this patent is extended or adjusted under 35 U.S.C. 154(b) by 1261 days.

(21) Appl. No.: 13/992,324

(22) PCT Filed: Dec. 12, 2011

(86) PCT No.: PCT/IB2011/055599
§ 371 (c)(1),
(2), (4) Date: Aug. 26, 2013

(87) PCT Pub. No.: WO2012/080928
PCT Pub. Date: Jun. 21, 2012

(65) Prior Publication Data
US 2013/0327223 A1  Dec. 12, 2013

(30) Foreign Application Priority Data

Dec. 15, 2010 (IT) .............................. MO2010A0352

(51) Int. Cl.
A47J 31/36 (2006.01)
B65D 85/804 (2006.01)
A47J 31/40 (2006.01)

(52) U.S. Cl.
CPC ...... B65D 85/8043 (2013.01); A47J 31/3623 (2013.01); A47J 31/3628 (2013.01); A47J 31/3676 (2013.01); A47J 31/407 (2013.01)

(58) Field of Classification Search
CPC . A47J 31/3623; A47J 31/3628; A47J 31/3676
USPC .................. 99/295, 323, 289 R; 426/77, 78
See application file for complete search history.

(56) References Cited

U.S. PATENT DOCUMENTS

| 2,778,739 | A |   | 1/1957 | Rodth |   |
|---|---|---|---|---|---|
| 4,452,130 | A | * | 6/1984 | Klein | A47J 31/005 99/307 |
| 5,111,740 | A | * | 5/1992 | Klein | A47J 31/005 99/295 |
| 5,390,587 | A | * | 2/1995 | Wu | E03C 1/046 210/449 |
| 5,840,189 | A |   | 11/1998 | Sylvan et al. |   |

(Continued)

FOREIGN PATENT DOCUMENTS

| AU | 655184 | 1/1992 |
| CA | 2046558 | 1/1992 |

(Continued)

*Primary Examiner* — Reginald L Alexander
(74) *Attorney, Agent, or Firm* — Laubscher, Spendlove & Laubscher, P.C.

(57) ABSTRACT

A capsule for beverages includes an external casing provided with a first base wall and with a first side wall defining a cavity that is open and suitable for containing a filtering element and a product for obtaining a beverage and a first covering element fixed to a first rim of the external casing to close hermetically the cavity. The filtering element includes a second base wall and a second side wall that extends from the second base wall to a second rim fixed to the first base wall. The product is housed in a first chamber defined between the first side wall and the second side wall. The capsule can be used in a machine for producing a beverage.

19 Claims, 4 Drawing Sheets

(56) References Cited

U.S. PATENT DOCUMENTS

| | | | |
|---|---|---|---|
| 6,645,537 B2* | 11/2003 | Sweeney | B65D 85/8043 206/222 |
| 2005/0051478 A1 | 3/2005 | Karanikos et al. | |
| 2010/0068361 A1* | 3/2010 | Bongers | B65D 85/8043 426/431 |
| 2011/0045144 A1* | 2/2011 | Boussemart | B65D 85/8043 426/80 |

FOREIGN PATENT DOCUMENTS

| | | |
|---|---|---|
| EP | 0468079 A1 | 1/1992 |
| FR | 2556323 A1 | 6/1985 |
| FR | 2617389 A1 | 1/1989 |
| WO | 2005026018 A1 | 3/2005 |

* cited by examiner

CAPSULE FOR BEVERAGE AND MACHINE FOR PRODUCING A BEVERAGE

This application is a § 371 National Stage Entry of PCT International Application No. PCT/IB2011/055599 filed Dec. 12, 2011. PCT/IB2011/055599 claims priority to IT Application No. MO2010A000352 filed Dec. 15, 2010. The entire contents of these applications are incorporated herein by reference.

The invention relates to capsules for preparing beverages in automatic or semiautomatic dispensing machines, in particular it relates to a capsule provided with an internal filter containing a product for preparing a hot beverage, for example coffee or tea. The invention further refers to a machine for producing a beverage using the aforesaid capsule.

Disposable capsules are known that are sealed with an internal filtering element are known. The capsules include a container or external casing made of impermeable plastic material shaped as a beaker or cup, and are provided with a bottom wall and a side wall that defines an upper opening. The latter is closed hermetically by a cover so as to seal inside the container the filtering element or filter containing the product from which a beverage is obtained. The cover and the bottom wall of the container are perforable (by a suitable mechanism of a beverage machine) to enable pressurised liquid, typically water, to be poured (generally from above and through the cover). The beverage to be extracted is obtained from the percolation of the aforesaid liquid through the product (generally from the bottom, through the bottom wall).

The filter, which is shaped in such a manner as to make a cavity open at the top to contain the product, is fixed, in particular welded, to the side wall of the container at an upper peripheral rim thereof. The filter divides the inside of the container into a first upper chamber containing the product and which is accessible through the upper opening of the container (to enable filling thereof) and a second lower chamber, comprised between the filter and the bottom wall and/or the side wall of the container, which enables the beverage to be drawn that is obtained from the product.

U.S. Pat. No. 5,840,189 illustrates a capsule of the type disclosed above provided with an internal filter having a conical or frustoconical shape and substantially smooth walls.

WO 2005/026018 discloses a capsule of the type disclosed above provided with an internal filter in the form of a cup constituted by a flat bottom wall and by a side wall diverging upwards to an annular upper rim. The side wall is also pleated, or folded, in such a manner as to form with the side wall of the container external channels that enable the beverage to pass through. The annular rim of the filter is welded to the side wall of the container at an internal portion thereof near the upper opening of said container.

A drawback of the capsules disclosed above resides in the manner of fixing the filter to the container, which may cause, in use, laceration or breaking of the aforesaid filter and the subsequent release of the product into the beverage, which is thus altered. In fact, the pressure of the liquid poured into the capsule together with the weight of the wet product can cause the filter to be lacerated in one or more points and/or the partial or total detachment of the filter from the container. Such drawbacks may occur because of the narrow mechanical features of the material of which the filter is made (typically filter paper that is permeable to liquids, which is light, thin and with very low resistance to traction) in combination with the end position and the limited extend of the rim of the filter welded internally to the side wall of the container.

Another drawback of known capsules is that they have to be used in machines for beverages provided with a suitable extraction arrangement that is able to perforate the capsule and enable the beverage to exit. Such an extracting arrangement not only makes the structure of the machine more complex and costly, but as it is in contact with the dispensed beverages it should be properly washed after each dispensing both for hygienic reasons and in order not to compromise the taste/smell of a subsequently dispensed beverage (for example, a herbal tea dispensed after a coffee). Nevertheless, a washing arrangement is not always present in known machines because of the structural complexity and cost.

An object of the present invention is to improve the known capsules for beverages, in particular the capsules comprising a container or external casing housing an internal filtering element containing a product for preparing a beverage.

Another object is to make a capsule for beverages provided with an internal filtering element that in use does not get lacerated and/or detached from the respective external casing, causing the release of the product contained therein into the beverage.

A further object is to make a capsule provided with an internal filtering element that permits a flow and optimal percolation of the liquid through the product to produce the beverage.

Still another object is to obtain a capsule provided with an internal filtering element with a great filtering surface and which is able to dispense a beverage directly into a fruition container.

In a first aspect of the invention there is provided a capsule for beverages provided with an internal filtering element made according to claim 1.

Owing to this aspect of the invention it is possible to make a capsule for beverages provided with an external casing and with an internal filtering element, containing a product for preparing a beverage, that in use does not get lacerate and/or detached from the external casing, causing the product to be released into the beverage.

In one embodiment, the filtering element, in particular of convergent shape from a base wall of the external casing or of cylindrical shape, is fixed at opposite ends to said base wall and to a covering element of the capsule. In this manner, the form of the filtering element is maintained and the filtering action thereof is appropriately supported without the filtering element collapsing or folding under the thrust of the pressurised liquid and/or of the wet product. In particular, one side wall of the filtering element is maintained suitably taut. The arrangement and the extent of the joining or welding portions prevent in use the occurrence of lacerations of the material or undesired detachments of the filtering element. The shape of the filtering element further ensures that there is a wide filtration surface.

In another embodiment the capsule includes a filtering element, with a shape that for example converges from a base wall of the external casing, which is kept in shape and is suitably supported by an extracting arrangement of a machine for beverages. The extracting arrangement includes a punch having a shape that is convergent on and complementary to that of the filtering element and is insertible into the capsules so as to adhere to and support at least the side wall of the filtering element, thereby enabling the beverage to pass and to be dispensed.

In a further embodiment the capsule includes a supporting arrangement interposed between the external casing and the filtering element for supporting and keeping the latter in shape. The supporting arrangement includes an element, for example a tapered element, having a shape that is complementary to that of the filtering element provided with walls having openings for the passage of the beverage. The supporting arrangement prevents the filtering element from being crushed or lacerated by the thrust of the pressurized liquid and/or of the wet product.

In a second aspect of the invention, a machine is provided for producing a beverage, using the capsules of the first aspect, according to claim 13.

The invention can be better understood and implemented with reference to the attached drawings that illustrate some embodiments thereof by way of non-limiting example, in which.

Figure 1:
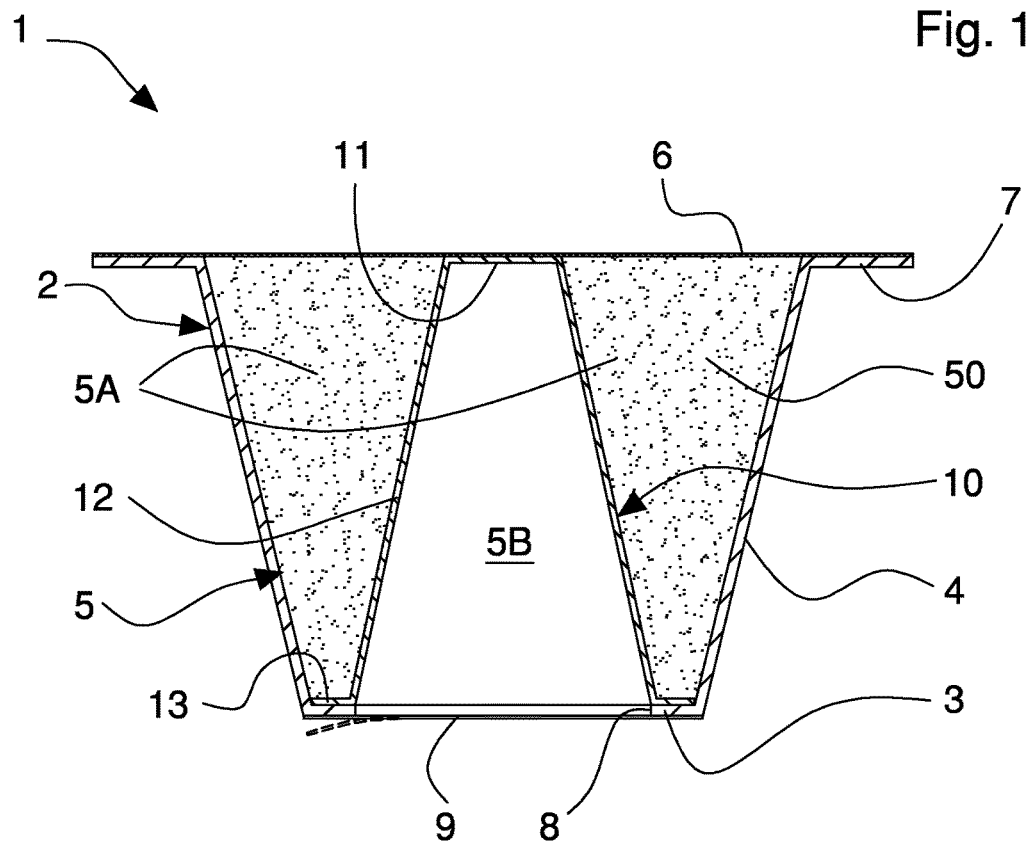
FIG. 1 is a cross section of a capsule for beverages with internal filtering element according to the invention.
Figure 2:
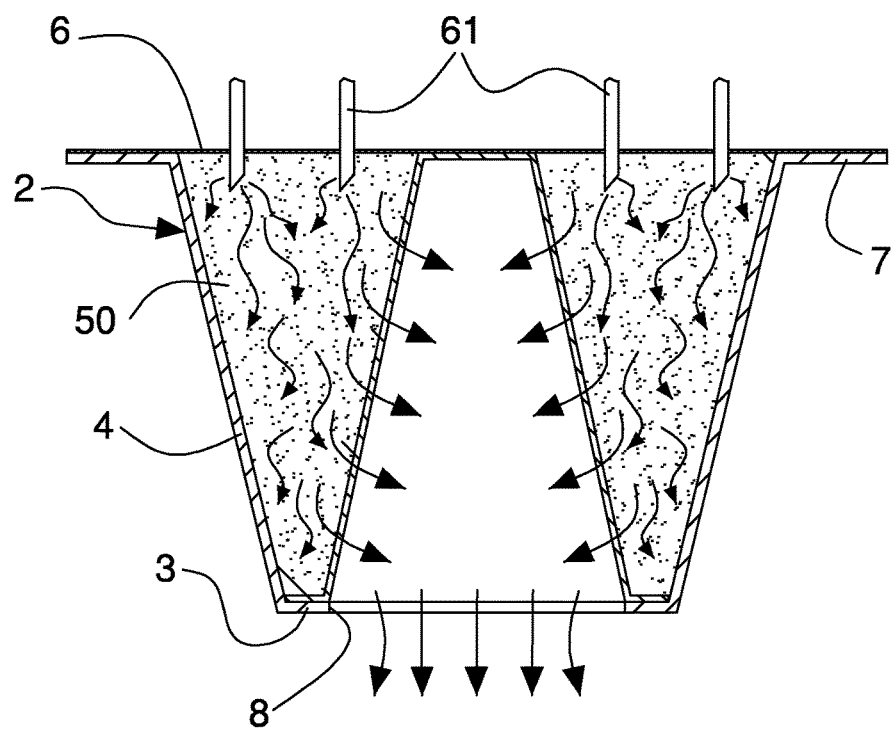
FIG. 2 is a section like the one in FIG. 1, illustrating the capsule in a condition of use.
Figure 3:
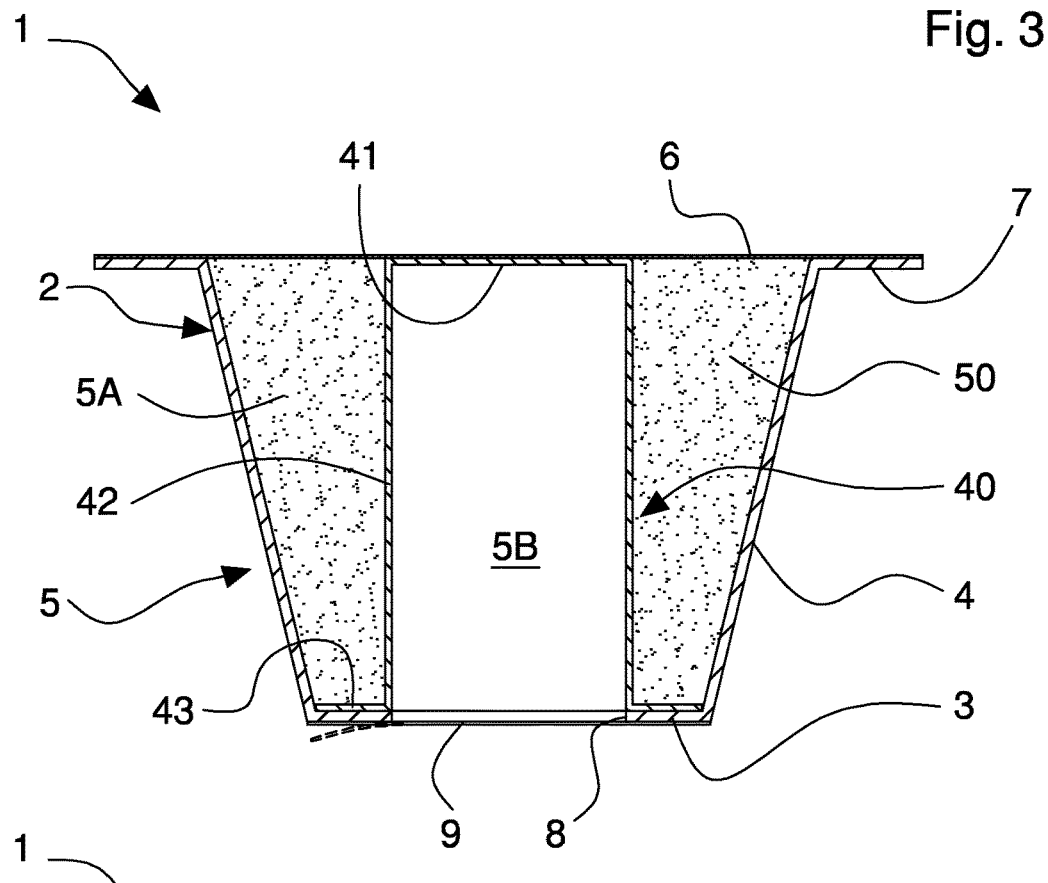
FIG. 3 is a cross section of another embodiment of the capsule in FIG. 1.

With reference to FIGS. 1 to 3, there is illustrated a capsule 1 for beverages comprising an external casing 2, or container, which is substantially beaker or cup-shaped, provided with a first base wall 3 and with a first side wall 4 defining a cavity 5 that is open and suitable for containing a filtering element 10 and a product 50 from which to obtain the beverage, typically by percolation.

A first covering element 6 is fixed, in particular welded, to a first peripheral rim 7 of said external casing 2 to close hermetically the cavity 5, and thus to close hermetically the filter 10 and the product 50 inside the capsule 1 (FIG. 3). The first rim 7 comprises a respective flange or annular crown connected to the first side wall 4 on an opposite side to the first base wall 3. The first base wall 3 and the first rim 7 are substantially flat and parallel to one another.

In the illustrated embodiment, the first side wall 4 diverges from the first base wall 3 to the first rim 7 and has a shape which is for example frustoconical.

The external casing 2 is, for example, made of a single body by forming a sheet of material that is thermoformable and impermeable to liquids and gases to preserve the aroma and fragrance of the product 50.

The filtering element 10 comprises a second base wall 11 and a second side wall 12 that extends, in particular diverges, from said second base wall 11 to a peripheral second rim 13 that is fixed, in particular welded, to the first base wall 3. The second rim 13 comprises a respective flange or annular crown that is substantially flat and connected to said second side wall 12. The filtering element 10, in the illustrated embodiment has a frustoconical form.

The first base wall 3 and the second base wall 11 are substantially flat and parallel to one another.

The second base wall 11 of the filtering element 10 is further fixed, in particular welded, to the first covering element 6. In this manner, the filtering element 10, fixed to the two opposite ends, is kept in shape and supported in the filtering action without collapsing or folding under the thrust of the pressurised liquid and/or of the wet product. In particular, the second side wall 12 is maintained appropriately taut and supported. It should be noted that the arrangement and the extent of the joining or welding portions (second peripheral rim 13 and second base wall 11) prevent, in use, that lacerations of the material or undesired detachments of the filtering element 10 occur.

The filtering element 10 is made of material that is permeable to the liquids, is light and thin, typically filter paper made of cellulose or of a polymeric material.

The product 50 is housed in a first chamber 5A defined inside the cavity 5 by the filtering element 50 and comprised between the first side wall 4 and the second side wall 12. The shape and the arrangement of the filtering element 10 ensure that the filtering surface made by the second side wall 12 is wide and extensive.

The first base wall 3 is provided with a through opening 8 that permits access to a second chamber 5B formed by the second side wall 12 and by the second base wall 11 inside the cavity 5.

The opening 8 is closed hermetically by a second covering element 9 fixed, in particular welded, to an outer surface of said first base wall 3.

The first covering element 6 and the second covering element 9 include, for example, films of aluminium. The first covering element 6 is perforable by a dispensing arrangement 61 dispensing the pressurized liquid of a machine for beverages in which the capsule 1 of the invention can be used.

The second covering element 9 is fixed in a removable manner, in particular in a peelable manner, to the first base wall 3 to enable the beverage to exit the capsule 1. In this manner, the capsule 1 of the invention enables the beverage to be dispensed directly into the fruition container, for example a cup or a beaker. The dispensing machine that uses the aforesaid capsule 1 can thus be devoid of an extracting arrangement and thus have a simpler and less expensive structure. Further, the absence of the extracting arrangement ensures greater hygiene and cleanliness in the dispensing process. Further, the taste/flavor of a beverage cannot be altered by a previously dispensed beverage.

Alternatively, the second covering element 9 can be fixed stably and in this case it is perforable by an extracting arrangement of the machine for beverages, the extracting arrangement removing the beverage from the capsule 1.

The second covering element 9 can also be removable and perforable.

FIG. 3 illustrates a version of the capsule 1 that differs from the embodiment disclosed above by the filtering element 40 that is provided with a second side wall 42 that is substantially orthogonal to the first base wall 3 and to the second base wall 41 and has, for example, a cylindrical or prismatic shape. The second base wall 41 and the second rim 43 of the filtering element 40, also in this case, are fixed respectively to the first covering element 6 and to the first base wall 3 of the external casing 2.

Figure 4:
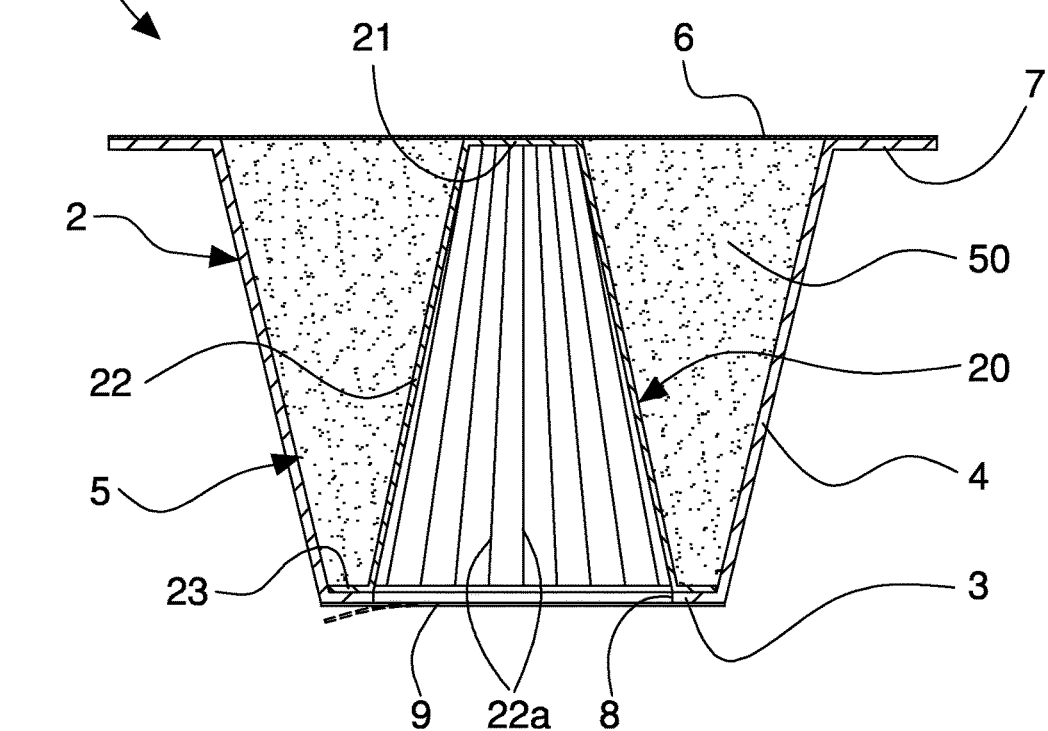
FIG. 4 is a cross section of a further embodiment of the capsule in FIG. 1.

FIG. 4 illustrates a further version of the capsule 1 that differs from the embodiment in FIG. 1 by the filtering element 20 that is provided with a second side wall 22 comprising a plurality of longitudinal pleats or folds 22a that is able to increase a filtering surface of the filtering element 20. The second base wall 21 and the second rim 33 of the filtering element 20, also in this case, are fixed respectively to the first covering element 6 and to the first base wall 3 of the casing 2.

Figure 5:
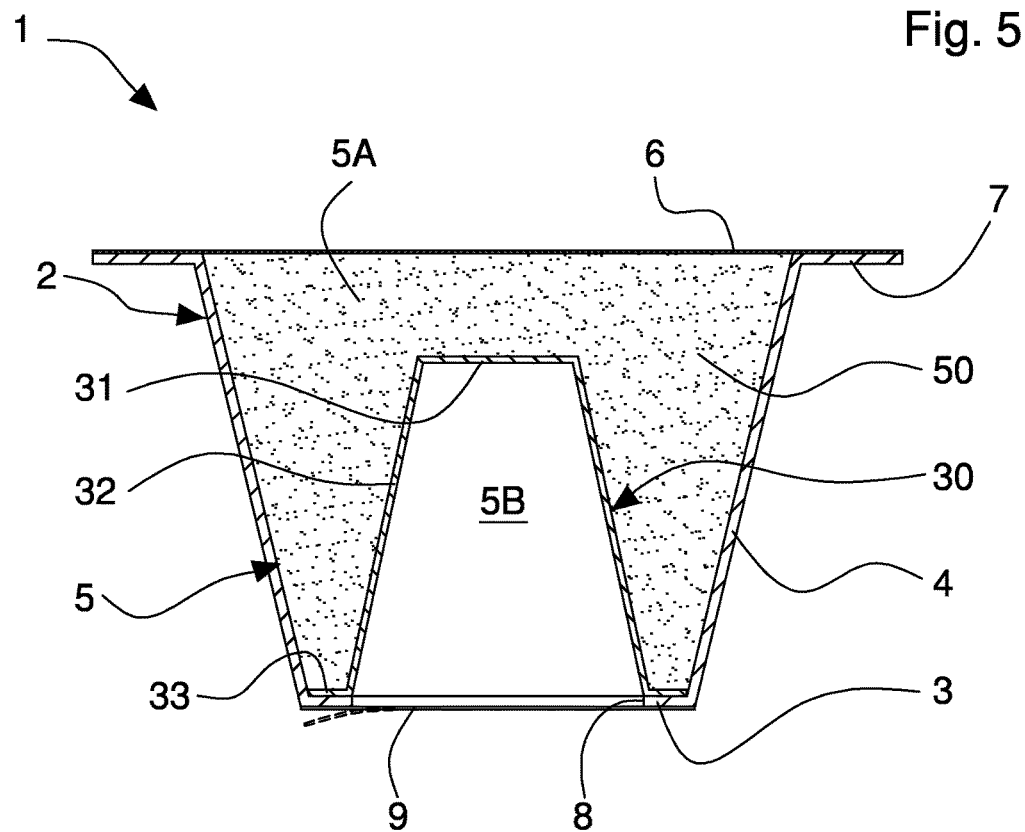
FIG. 5 is a cross section of another embodiment of the capsule for beverages with an internal filtering element of the invention.
Figure 6:
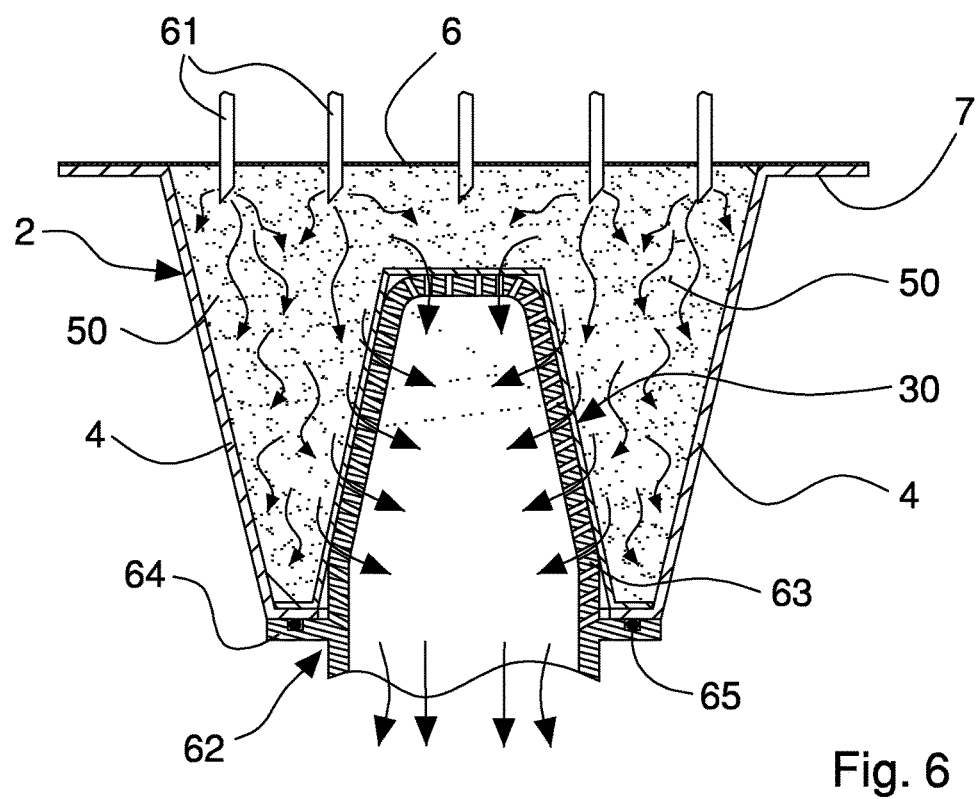
FIG. 6 is a section like the one in FIG. 5, illustrating the capsule in a condition of use.

FIG. 5 illustrates another embodiment of the capsule 1 of the invention that differs from the one disclosed above and shown in FIGS. 1 and 2 through the fact that it comprises a filtering element 30, which is fixed only to the first base wall 3 of the external casing 2 (via the second rim 33) and not to the first covering element 6 (via the second base wall 31). The filtering element 30, for example of frustoconical shape, has in this case longitudinal extent, or height, that is less then the depth or height of the cavity 5.

In order to prevent the filtering element 30 from being crushed or lacerated by pressurized liquid, a machine for beverages is necessary that is amongst other things provided with an extracting arrangement 62 that is insertible into the capsule 1 through the first base wall 3, in such a manner as to abut on and support the filtering element 30, at least during pouring of the liquid, and remove a beverage obtained from the product 50. The extracting arrangement 62 is insertible through the opening 8 of the first base wall 3, which permits access to the second chamber 5B formed by the filtering element 30.

The extracting arrangement includes a punch 62 having a convergent shape that is complementary to that of the filtering element (for example of frustoconical shape) in such a manner as to adhere to, and support the second side wall 32 and the second base wall 31. The punch 62 is substantially hollow and provided with perforated outer walls 63 to enable the beverage to pass through and subsequently exit for dispensing.

The punch 62 further comprises an abutting flange 64 arranged for sealingly abutting on an external surface of the first base wall 3. The hydraulic seal is ensured by an annular ring 65 housed in a seat of said abutting flange 64.

The machine for beverages includes a dispensing arrangement 61 that is able to perforate the first covering element 6 and pour the pressurized liquid into the first chamber 5A of the capsule 1 containing the product 50. The dispensing arrangement 61 includes, for example, one or more nozzles provided with pointed ends.

The dispensing arrangement 61 and/or the extracting arrangement 62 are movable along an operating direction, which is, for example, substantially orthogonal to the first covering element 6 and/or to the first base wall 3.

Figure 7:
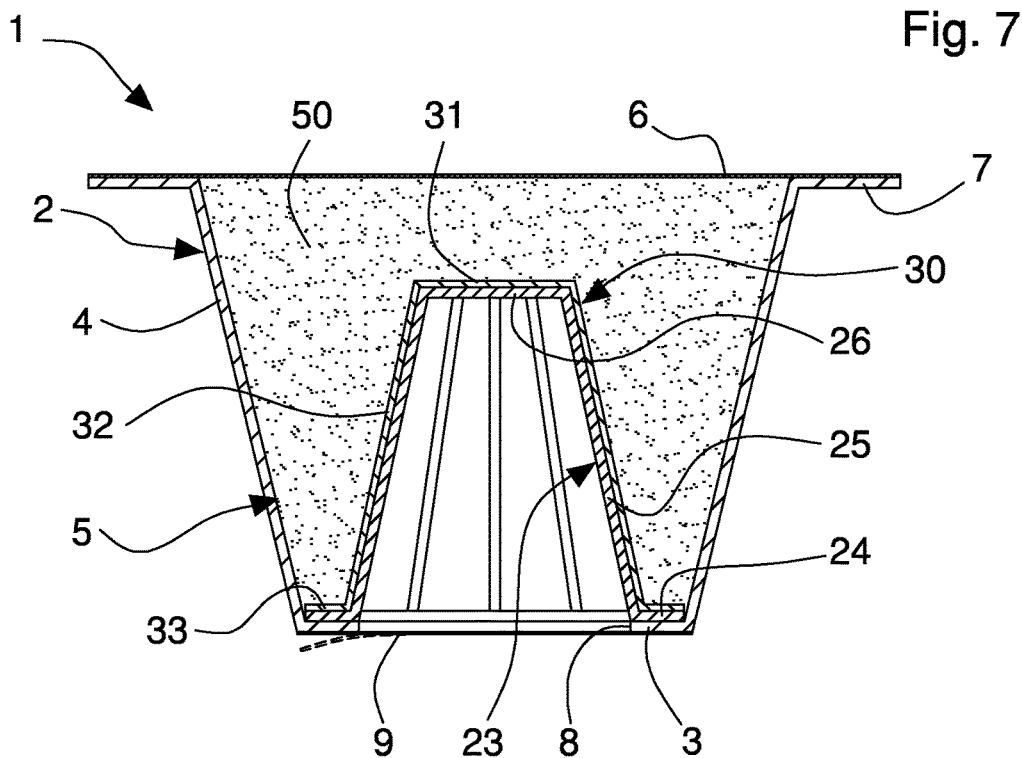
FIG. 7 is a cross section of a further embodiment of the capsule for beverages of the invention.

With reference to FIG. 7, there is illustrated a further embodiment of the capsule 1 of the invention that differs from the capsule disclosed previously in FIG. 5 through in that it includes a supporting arrangement 23 interposed between the first base wall 3 of the external casing 2 and the filtering element 30 for supporting and keeping the latter in shape.

Figure 9:
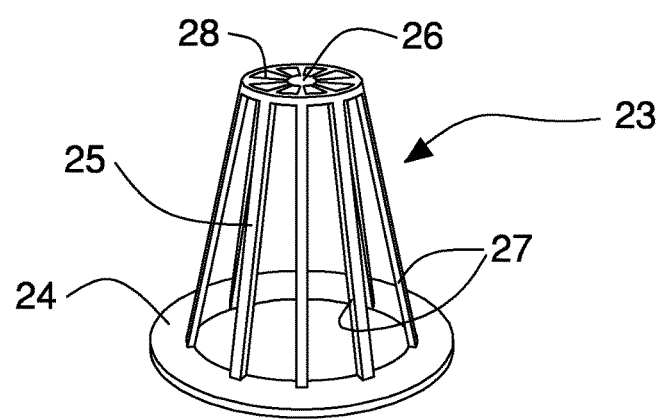
FIG. 9 is a perspective view of a supporting arrangement of an internal filter of the capsule of FIG. 7.

The supporting arrangement 23 includes an element having a shape that is complementary to that of the filtering element 30, for example tapered with a frustoconical shape, and provided with a peripheral third rim 24 and with a third side wall 25, which extends, in particular converges, from the third rim 24 to a third base wall 26. The third side wall 25 and the third base wall 26 are provided with respective through openings 27, 28 for the passage of the beverage (FIG. 9). The third rim 24 includes a respective flange or annular crown connected to the third side wall 25. The third rim 24 and the third base wall 26 have a substantially flat shape and are parallel.

The second rim 33 of the filtering element 30 is in this case fixed to the first base wall 3 via the third rim 24. The latter is in fact fixed, in particular welded, to the first base wall 3 and the second rim 33 is fixed, in particular welded, to said third rim 24.

In order to better lock the filtering element 10 to the supporting arrangement 23, the second base wall 31 of the latter is fixed, in particular welded, to the third base wall 26.

Figure 8:
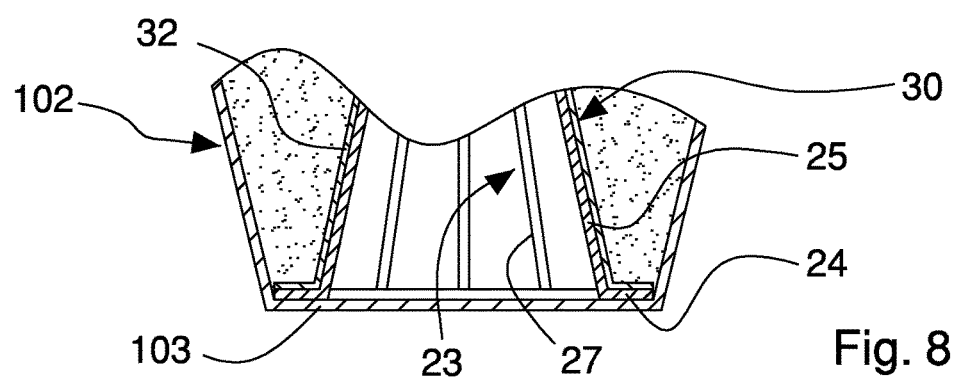
FIG. 8 is a partial cross section of a version of the capsule of FIG. 7.

FIG. 8 partially illustrates a version of the previously disclosed capsule 1 for beverages of FIG. 7, which differs from the latter by the first base wall 103 of the external casing 102 that is devoid of an opening for the exit of beverage. The first base wall 103 is thus perforable by an extracting arrangement of the machine for beverages.

The invention claimed is:

1. A capsule for a beverage, comprising
   (a) a casing provided with a first base wall and with a first side wall to define a cavity that is open and suitable for containing a filtering element and a product for obtaining a beverage; and
   (b) a first covering element fixed to a first rim of said casing to hermetically close said cavity, wherein said filtering element comprises a second base wall and a second side wall that extends from said second base wall to a second rim fixed to said first base wall, said second side wall comprising a plurality of pleats for increasing a filtering surface of said filtering element, said product being housed in a first chamber defined at least between said first side wall and said second side wall.

2. A capsule according to claim 1, wherein said second side wall diverges from said second base wall to said second rim.

3. A capsule according to claim 1, wherein said second base wall is fixed to said first covering element.

4. A capsule according to claim 1, wherein said first base wall comprises a first opening for access to a second chamber formed by said filtering element, said first opening being hermetically closed by a second covering element fixed externally to said first base wall.

5. A capsule according to claim 4, wherein said second covering element is removably fixed to said first base wall.

6. A capsule according to claim 1, and further comprising a supporting arrangement interposed between said first base wall and said filtering element to support and maintain said filtering element in shape.

7. A capsule according to claim 1, wherein said first side wall diverges from said first base wall to said first rim.

8. A capsule according to claim 1, wherein said casing is made from thermoformable sheet material.

9. A machine for producing a beverage from a capsule provided with a filtering element according to claim 1, comprising
   (a) a dispensing device arranged for perforating a first covering element of said capsule and pouring a pressurized liquid into a first chamber of said capsule containing a product for a beverage; and
   (b) an extracting device that is insertible through a first base wall of said capsule inside the capsule so as to abut on and support said filtering element during pouring of said liquid and thus remove a beverage obtained from said product, passing through said filtering element.

10. A machine according to claim 9, wherein said extracting device comprises a punch having a shape that is complementary to a shape of said filtering element, said punch being substantially hollow and being provided with outer walls perforated for the passage of said beverage.

11. A machine according to claim 10, wherein said punch comprises an abutting flange arranged for sealingly contacting an external surface of said first base wall.

12. A machine according to claim 9, wherein said dispensing device and/or said extracting device are movable along an operating direction.

13. A capsule for a beverage, comprising
(a) a casing provided with a first base wall and with a first side wail to define a cavity that is open and suitable for containing a filtering element and a product for obtaining a beverage;
(b) a first covering element fixed to a first rim of said casing to hermetically close said cavity, wherein said filtering element comprises a second base wall and a second side wall that extends from said second base wall to a second rim fixed to said first base wall, said product being housed in a first chamber defined at least between said first side wall and said second side wall; and
(c) a supporting arrangement interposed between said first base wall and said filtering element to support and maintain said filtering element in shape, said supporting arrangement including an annular flange and a third side wall that converges from said annular flange to a third base wall, said third side wall and said third base wall being provided with respective through openings to enable said beverage to pass there through.

14. A capsule according to claim 13, wherein said second rim of said filtering element is fixed to said first base wall by said annular flange.

15. A capsule according to claim 13, wherein said second base wall of said filtering element is fixed to said third base wall of said supporting arrangement.

16. A machine for producing a beverage from a capsule provided with a filtering element according to claim 13, comprising:
(a) a dispensing device arranged for perforating a first covering element of said capsule and pouring a pressurized liquid into a first chamber of said capsule containing a product for a beverage; and
(b) an extracting device that is insertible through a first base wall of said capsule inside the capsule so as to abut on and support said filtering element during pouring of said liquid and thus remove a beverage obtained from said product, passing through said filtering element.

17. A machine according to claim 16, wherein said extracting device comprises a punch having a shape that is complementary to a shape of said filtering element, said punch being substantially hollow and being provided with outer walls perforated for the passage of said beverage.

18. A machine according to claim 17, wherein said punch comprises an abutting flange arranged for sealingly contacting an external surface of said first base wall.

19. A machine according to claim 18, wherein said dispensing device and/or said extracting device are movable along an operating direction.

* * * * *